United States Patent
Pereira et al.

(10) Patent No.: US 9,529,674 B2
(45) Date of Patent: Dec. 27, 2016

(54) STORAGE DEVICE MANAGEMENT OF UNRECOVERABLE LOGICAL BLOCK ADDRESSES FOR RAID DATA REGENERATION

(71) Applicant: Dell Products, LP, Round Rock, TX (US)

(72) Inventors: David M. Pereira, Austin, TX (US); Chandrashekar Nelogal, Round Rock, TX (US)

(73) Assignee: Dell Product, LP, Round Rock, TX (US)

( * ) Notice: Subject to any disclaimer, the term of this patent is extended or adjusted under 35 U.S.C. 154(b) by 336 days.

(21) Appl. No.: 13/920,731

(22) Filed: Jun. 18, 2013

(65) Prior Publication Data

US 2014/0372697 A1    Dec. 18, 2014

(51) Int. Cl.
    *G06F 11/10* (2006.01)
    *G06F 11/07* (2006.01)
(52) U.S. Cl.
    CPC .......... *G06F 11/1088* (2013.01); *G06F 11/076* (2013.01)
(58) Field of Classification Search
    CPC .............. G06F 11/0727; G06F 11/0775; G06F 11/2082; G06F 2212/104; G06F 3/0689; G06F 3/0619; G06F 3/0665; G06F 11/1088; G06F 11/076; G11B 2020/183
    See application file for complete search history.

(56) References Cited

U.S. PATENT DOCUMENTS

| | | | |
|---|---|---|---|
| 7,133,966 B2* | 11/2006 | Sato et al. ..................... | 711/114 |
| 7,281,160 B2* | 10/2007 | Stewart ....................... | 714/6.13 |
| 7,653,838 B2 | 1/2010 | Forrer, Jr. et al. | |
| 2010/0037091 A1* | 2/2010 | Baderdinni et al. ............. | 714/6 |
| 2014/0208155 A1* | 7/2014 | Pan ..................... | G06F 11/2087 |
| | | | 714/6.21 |

OTHER PUBLICATIONS

"ACS-4 Pending Errors Log, Revision 1," Hatfield, Jim, InterNational Committee for Information Technology, T13/f13104r1, Jun. 10, 2013 http://www.t13.org/Documents/MinutesDefault.aspx?months=2&DocumentType=8.
"Information technology—SCSI Block Commands—3 (SBC-3)T10/BSR INCITS 514," Penokie, George, InterNational Committee for Information Technology, Jun. 11, 2013 http://www.t10.org/cgi-bin/ac.pl.

* cited by examiner

*Primary Examiner* — David X Yi
*Assistant Examiner* — Rocio Del Mar Perez-Velez
(74) *Attorney, Agent, or Firm* — Larson Newman, LLP

(57) ABSTRACT

A host processing system includes a processor, a RAID controller, and a data storage device coupled to the RAID controller and operable to detect first unrecoverable data at a first logical block address (LBA) of the data storage device, log the first LBA in an unrecoverable LBA table of the data storage device, provide the unrecoverable LBA table to the RAID controller, and in response to receiving a write to the first LBA, remove the first LBA from the unrecoverable LBA table.

20 Claims, 5 Drawing Sheets

STORAGE DEVICE MANAGEMENT OF UNRECOVERABLE LOGICAL BLOCK ADDRESSES FOR RAID DATA REGENERATION

FIELD OF THE DISCLOSURE

This disclosure relates generally information handling systems, and more particularly relates to a system and method of efficient RAID data regeneration using storage device management of unrecoverable logical block addresses.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can include a Redundant Array of Independent Drives (RAID) storage array, including a RAID controller for managing data storage on the RAID storage array.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
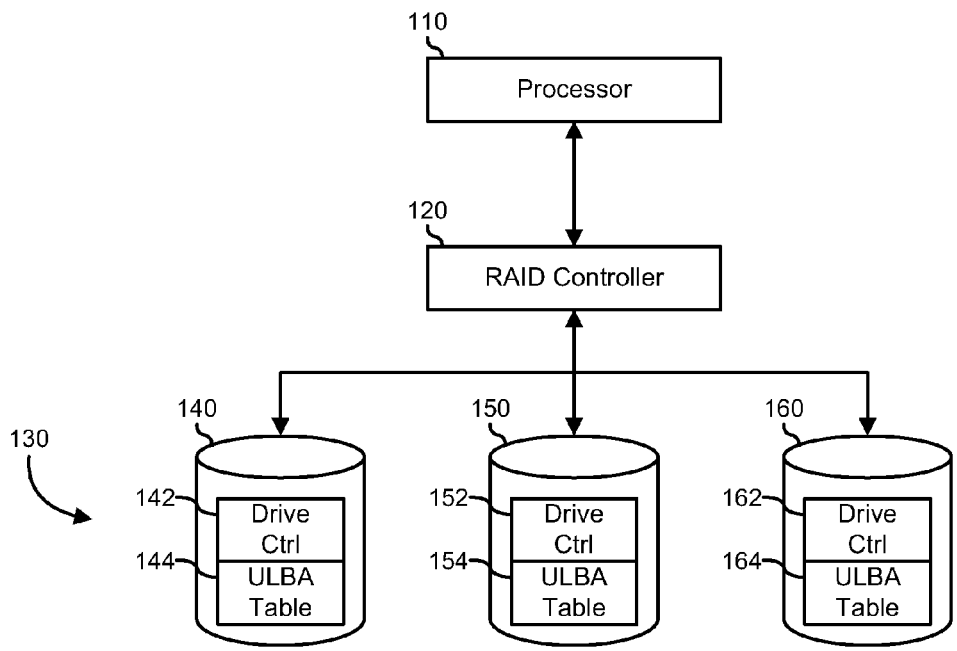
FIG. 1 is a block diagram illustrating a host processing system including a RAID controller and a RAID array according to an embodiment of the present disclosure.

FIG. 1 illustrates a host processing system 100 that can be implemented on one or more information handling systems. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Host processing system 100 includes a processor 110, a RAID controller 120, and a RAID array 130. RAID array 130 includes data storage devices 140, 150, and 160. Data storage devices 140, 150, and 160 represent one or more independent data storage devices that provide a readable and writable storage medium for host processing system 100, and that are configurable by RAID controller 120 into the elements of RAID array 130. As such, storage devices 140, 150, and 160 can include hard disk drives (HDDs), rewritable optical disk drives (ODDs), solid state drives (SSDs), other types of readable and writable storage media, or a combination thereof. RAID controller 120 operates to store data in RAID array 130 by mirroring data across multiple data storage device 140, 150, and 160, by striping data across the data storage devices, by storing parity data across the data storage devices, or a combination thereof. For example, RAID controller 120 can implement RAID array 130 using a standard RAID level arrangement, such as RAID 3, RAID 5, RAID 6, or another standard RAID level, or using a non-standard RAID arrangement, as needed or desired. As such, RAID controller 120 stores data for host processing system 100 in stripes or rows which include multiple logical blocks from one or more of data storage devices 140, 150, and 160, where one or more of the logical blocks includes calculated parity data or mirrored data. An example of a data storage device includes a Small Computer System Interconnect (SCSI) device, a Serial AT Attach (SATA) device, another type of data storage device, or a combination thereof.

In a particular embodiment, RAID controller 120 operates to reconstruct the data stored on a failed data storage device 140, 150, or 160, or from an unreadable logical block on one of the data storage devices. Such failures can occur as a result of component failures in a failing data storage device 140, 150, or 160, damage to some or all of the storage media of the failing data storage device, contaminants on a portion of the storage media, problems that may occur when data is written to the logical block, or based upon other failure mechanisms. RAID controller 120 reconstructs the data from a failed data storage device 140, 150, or 160, or from the unreadable logical block using the calculated parity data or mirrored data associated with the failed data storage device or unreadable logical block that is stored on the other data storage devices.

In a particular embodiment, RAID controller 120 detects the presence of a failed data storage device 140, 150, or 160, or of an unreadable logical block when an attempt to read the data stored therein fails, and the RAID controller regenerates the data in response to detecting the failure. Data storage devices 140, 150, and 150 operate to automatically reallocate logical blocks on write operations, such that a rewrite to a damaged or failed logical block address (LBA) will be reassigned to a new, non-failing, physical location on the data storage device, while maintaining the same LBA. In this way, the regenerated data is not restored at the old, failing, physical location.

Figure 2:
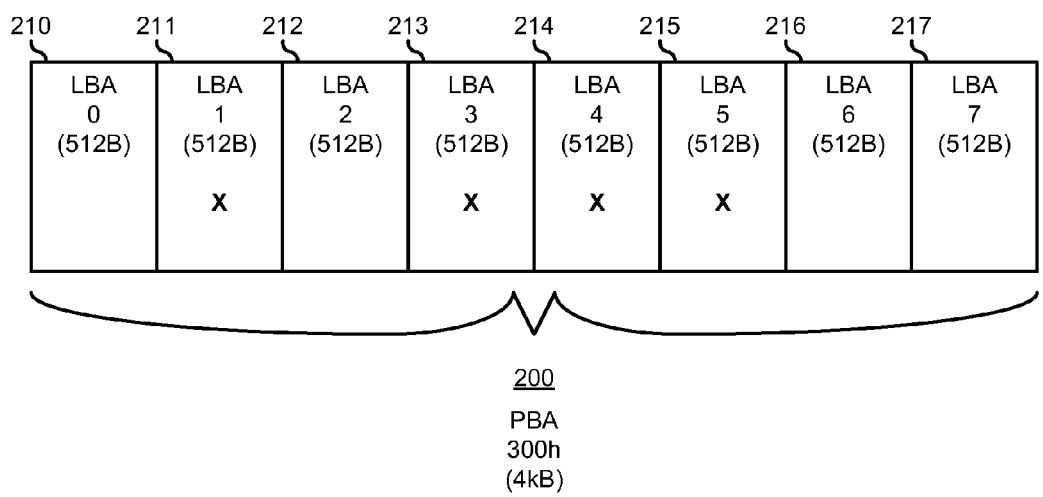
FIG. 2 is a diagram illustrating small logical block emulation in a large physical block of a data storage device according to an embodiment of the present disclosure.

FIG. 2 illustrates a large physical block 200 of storage media on a data storage device such as data storage devices 140, 150, and 160. Physical block 200 is 4096 bytes (4 kB) and is operated in a small block emulation mode where the physical block is subdivided into small logical blocks 210, 211, 212, 213, 214, 215, 216, and 217, each of 512 bytes. Note that, in the embodiment of FIG. 1 where RAID controller 120 detects unreadable logical blocks when read attempts fail, the RAID controller can remain unaware of other failing logical blocks until such time that a read is issued to the other failing blocks. This may represent a significant problem when multiple logical blocks are stored within a single larger physical block as illustrated in FIG. 2. This is because a failure at one logical block (e.g., LBA 213) within physical block 200 may be indicative of failures in one or more of the other logical blocks (e.g., LBAs 211, 214, and 215) within the physical block, but such additional LBA failures will go undetected until such time as RAID controller 120 issues a read to these other failing LBAs. This situation can be exacerbated when RAID controller 120 is regenerating the data for a failed data storage device 140, 150, or 150, by issuing reads to large chunks of the other data storage devices. Here, RAID controller 120 is much more likely to encounter undetected LBA failures, resulting in unrecoverable data on RAID array 130. The skilled artisan will recognize that, when RAID array 130 is configured as a RAID 6 array, unrecoverable data will not occur unless a triple failure is encountered. However, even in a RAID 6 array, the likelihood of unrecoverable data is increased because of the undetected LBA failures.

Data storage device 140 includes a drive controller 142 and a ULBA table 144, data storage device 150 includes a drive controller 152 and a ULBA table 154, and data storage device 160 includes a drive controller 162 and a ULBA table 164. In a particular embodiment, in addition to the LBA failures that are detected by RAID controller 120 in response to failed read operations, one or more of drive controllers 142, 152, and 162 operate to detect uncorrectable LBA (ULBA) failures in the storage media of the data storage device, and to log the ULBAs in respective ULBA tables 144, 154, and 164. For example, data storage devices 140, 150, and 160 can perform various self tests to identify and log ULBA failures to ULBA tables 144, 154, and 164. Typically, a self test results log page operates to identify only a first failing ULBA, and may not identify subsequent failing ULBAs. Here, drive controllers 142, 152, and 162 operate to track the ULBA failures as they are detected and to provide information related to the ULBA failures to the respective ULBA tables 144, 154, and 164. For example, drive controller 142 can detect multiple ULBA failures and provide the ULBAs, the physical block address associated with each ULBA, a timestamp for when the failure was detected, or other information to ULBA table 144.

TABLE 1

ULBA Table

| Logical Block | Physical Block | Failure | Timestamp |
| --- | --- | --- | --- |
| 301h | 300h | Read LBA | 19:05:32 |
| 303h | 100h | Self-Test | 18:38:42 |
| 58Fh | 300h | Background Scan | 18:34:12 |
| 123h | 230h | Other Scan | 05:52:30 |
| 78Ah | 4D0h | Read LBA | 02:15:27 |

Further, drive controllers 142, 152, and 162 can perform background media scan functions that operate to verify the integrity of LBAs, to attempt to repair ULBAs, and to log information associated with the irreparable ULBAs to respective ULBA tables 144, 154, and 164. RAID controller 120 can then receive a background media scan results log page that identifies the ULBAs on the storage media. Other background media scans, such as adjacent track tests may also result in drive controllers 142, 152, and 162 identifying additional ULBAs, and logging information associated with the ULBAs to respective ULBA tables 144, 154, and 164. Table 1 illustrates an example ULBA table. In a particular embodiment, RAID controller 120 sends a request to data storage devices 140, 150, and 160 to receive the ULBA information stored in ULBA tables 144, 154, and 164 to identify ULBAs that are undetected by performing read operations. Then, RAID controller 120 utilizes idle time to regenerate the data for the ULBAs identified in ULBA tables 144, 154, and 164. Here, when drive controllers 142, 152, and 162 detect a regeneration of data on one of the identified ULBAs, that is, when the drive controller detects a write to an identified ULBA, the drive controller removes the LBA and the information associated with the failure from the respective ULBA tables 144, 154, and 164. In a particular embodiment, RAID controller 120 requests a subset of the ULBA information. For example, RAID controller 120 can request the ULBA information based upon the identifying source of the failure (e.g., Read LBA failure, Self-Test failure, Background Scan failure, Other failure), based upon a timestamp for the failure (e.g., Older than timestamp X, Newer than timestamp Y, Between timestamp A and timestamp B), based upon a physical block address, based upon an LBA, or on another grouping of ULBAs, as needed or desired. Here, drive controllers 142, 152, and 162 operate to sort their respective ULBA tables 144, 154, and 164 based upon the subset of ULBA information requested by RAID controller 120. In a particular embodiment, RAID controller 120 operates to request the ULBA information by issuing an appropriate protocol data unit (PDU) or command to data storage devices 140, 150, and 160.

Figure 3:
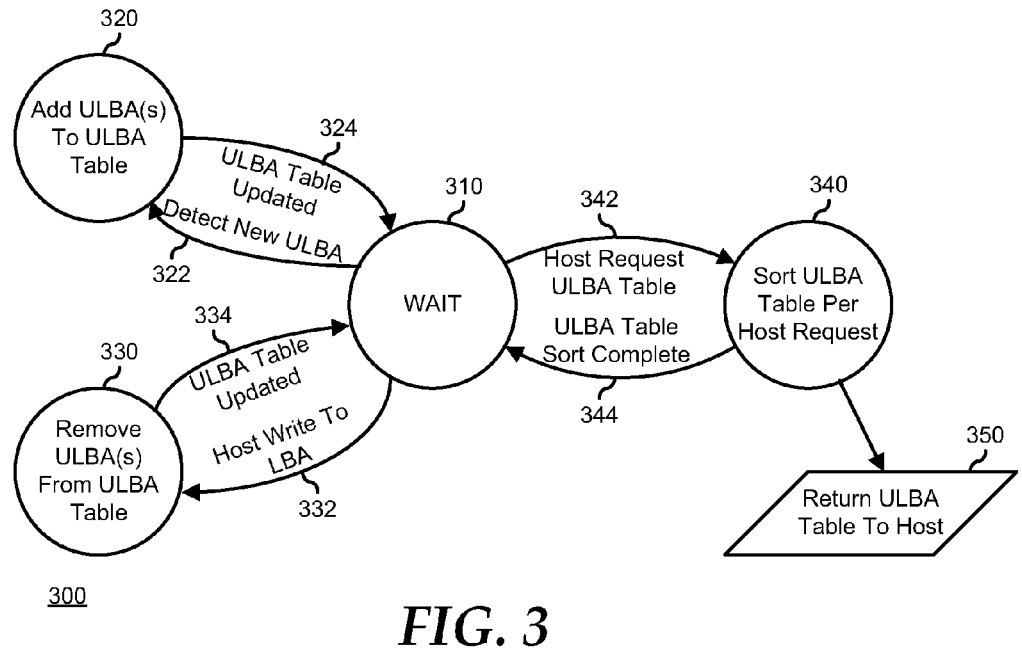
FIG. 3 is a state diagram for a data storage device of the RAID array of FIG. 1.

FIG. 3 illustrates a state diagram 300 for a data storage device such as data storage devices 140, 150, and 160. The data storage device begins in a WAIT state 310. The data storage device operates to discover new ULBAs in process 322, and moves to state 320 where the new ULBAs and the associated information are added to the data storage device's ULBA table. When the ULBA table is updated, the process ends 324 and the data storage device returns to WAIT state 310. When a host system writes to an LBA in the ULBA table in process 332, the data storage device moves to state 330 where the newly written LBA is removed from the ULBA table. When the ULBA table is updated, the process ends 334 and the data storage device returns to WAIT state 310. When the host system request the information from the ULBA table in process 342, the data storage device determines if a subset of ULBAs is being requested and sorts the ULBA table accordingly in state 340. The data storage device returns the ULBA information to the host system in process 350, the process ends 344 and the data storage device returns to WAIT state 310.

Figure 4:
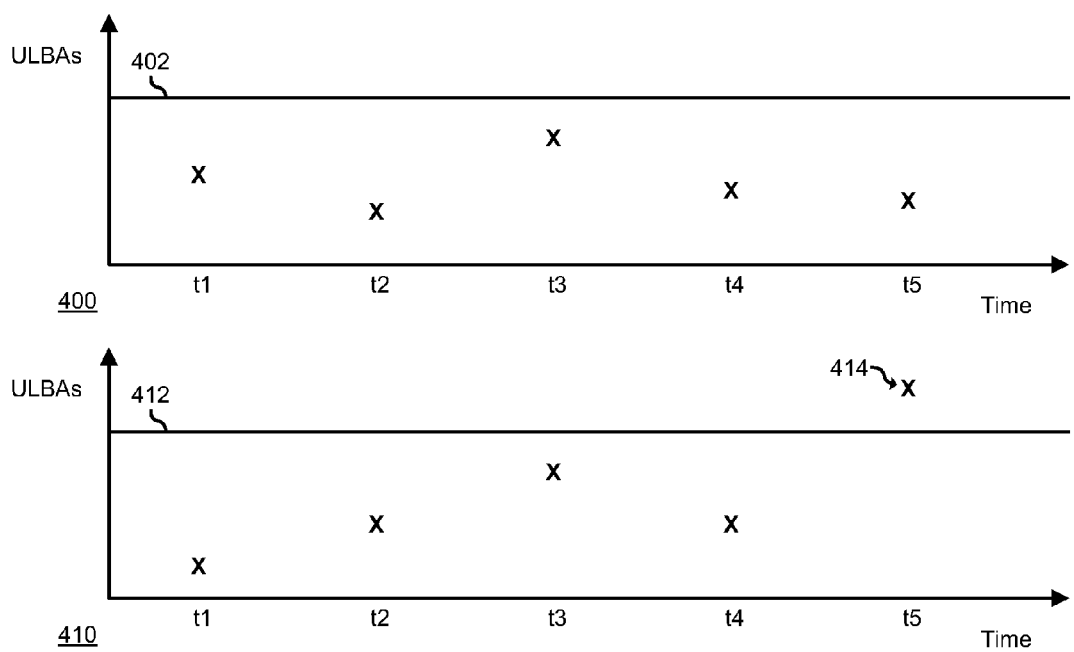
FIG. 4 includes graphs illustrating the occurrence of unrecoverable logical block addresses (ULBAs) over time for data storage devices according to an embodiment of the present disclosure.

FIG. 4 illustrates graphs 400 and 410 of the occurrence of ULBAs over time for a pair of data storage devices. Here, graph 400 includes a failure threshold 402 and graph 410 includes a failure threshold 412. Failure thresholds 402 and 412 indicate a threshold for ULBA failure rate, a number above which indicates that that the associated data storage device is in danger of failure. As illustrated, for each of five sample periods, t1-t5, the data storage device associated with graph 400 has a ULBA failure rate that is below failure threshold 402. Further, for each of four sample periods t1-t4, the data storage device associated with graph 410 has a ULBA failure rate below failure threshold 412, but at sample period t5, the failure rate exceeds the failure threshold. Thus, both data storage devices are operating normally at periods t1-t4, but at period t5, the data storage device associated with graph 410 is in danger of failure. In a particular embodiment, the determination of whether or not the ULBA failure rate exceeds a failure threshold is made by a drive controller of the associated data storage device, and an indication is provided to indicate that the data storage device is in danger of failure.

Figure 5:
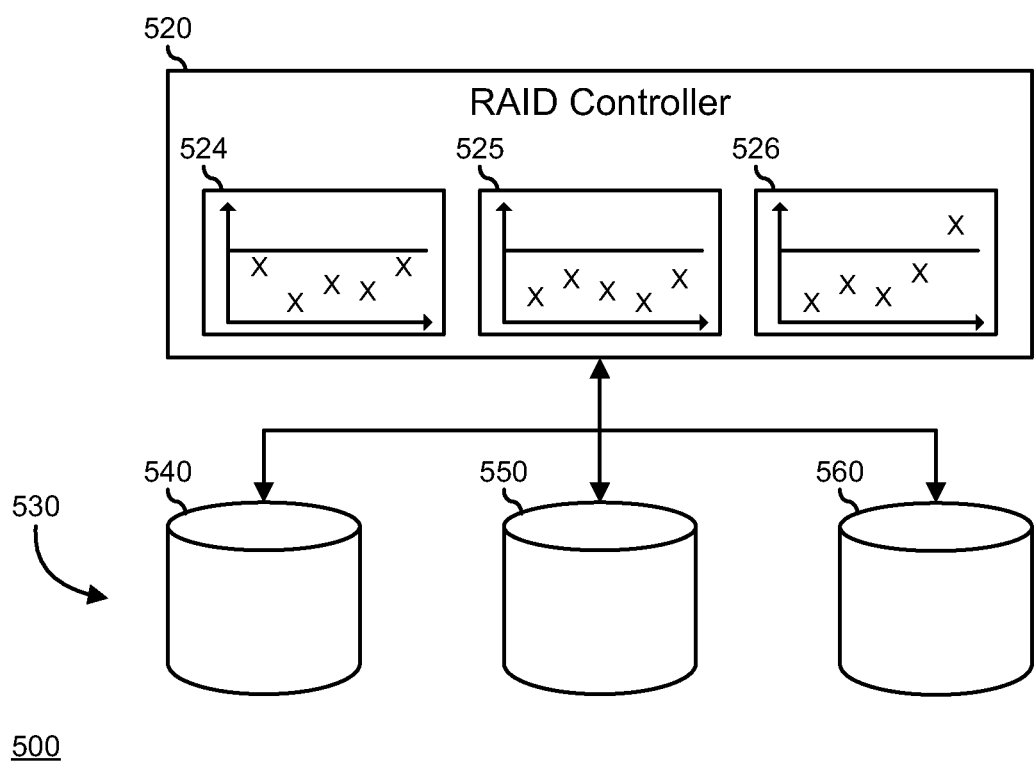
FIG. 5 is a block diagram illustrating a host processing system similar to the host processing system of FIG. 1.

FIG. 5 illustrates an embodiment of a host processing system 500 similar to host processing system 100, including a RAID controller 520 and a RAID array 530 including data storage devices 540, 550, and 560. Here, RAID controller 520 operates to track the ULBA failure rates for data storage devices 540, 550, and 550. As such, RAID controller 520 maintains a graph 524 for the ULBA failures on data storage device 540, a graph 525 for the ULBA failures on data storage device 550, and a graph 526 for the ULBA failures on data storage device 560. Here, graphs 524 and 525 indicate that data storage devices 540 and 550, respectively, are operating normally, having ULBA failure rates that are below a threshold, but that, at a last sample period, graph 526 indicates that data storage device 560 is in danger of failure because the ULBA failure rate exceeds the failure threshold. In response, RAID controller 520 can provide an indication to a technician to replace 560 before a failure occurs.

As illustrated in FIGS. 4 and 5, a single occurrence of a ULBA failure rate that is greater than a failure threshold is used as an indication that a data storage device is in danger of failing. However, the skilled artisan will recognize that other measures of the danger of failure can be applied based upon the tracking of ULBA failure rates. For example, a particular data storage device may be determined to be in danger of failing only after a predetermined number of samples are found to exceed the failure threshold, or if the number of samples that exceed the failure threshold in a certain amount of time is greater than a predetermined number. In another example, multiple failure thresholds may be utilized. A lower failure threshold may be used in association with a count the number of times that the ULBA failure rate exceeds the lower threshold, while a higher failure threshold may represent an absolute ULBA failure rate limit which, if exceeded, instantly indicates that the data storage device is in danger of imminent failure.

Figure 6:
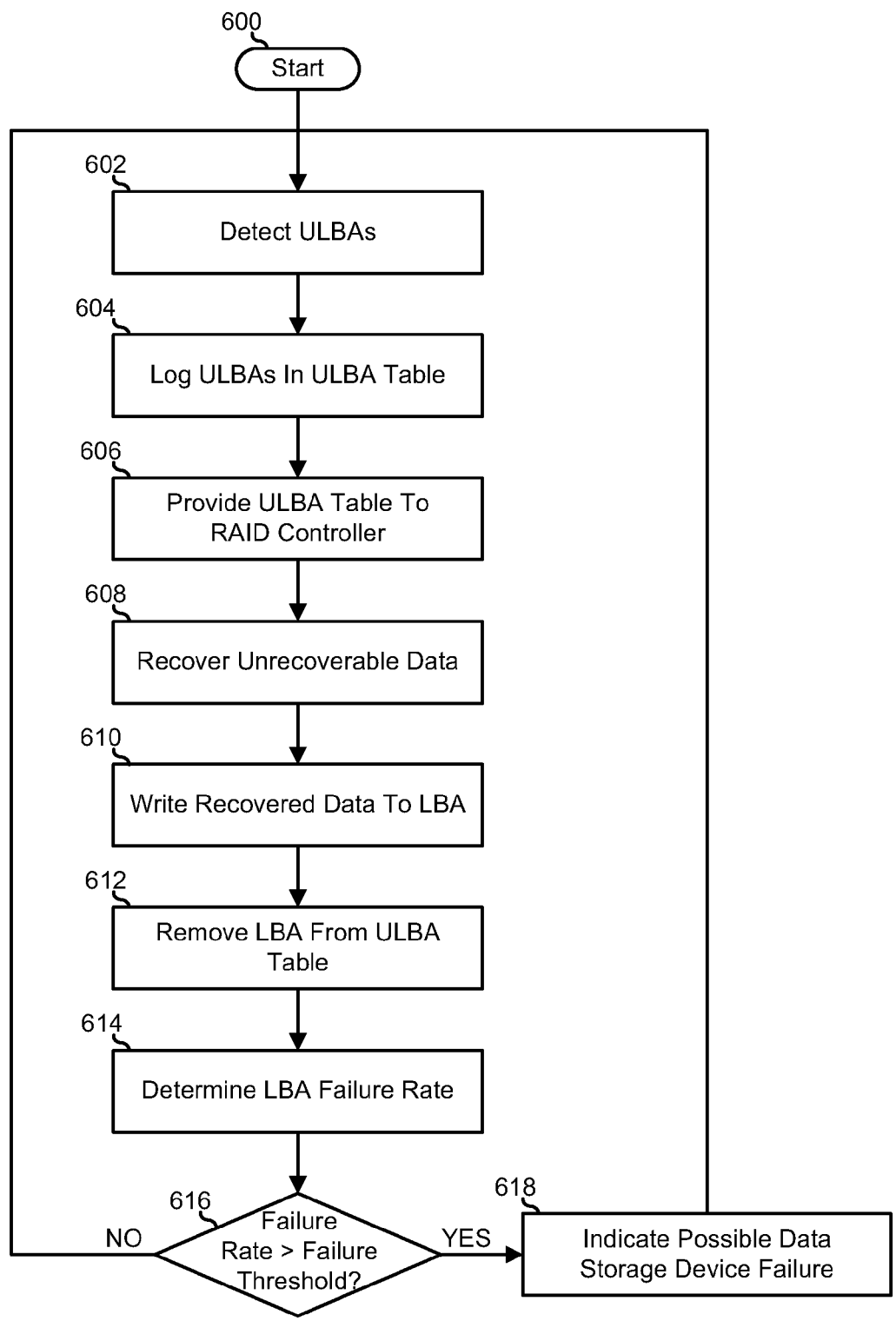
FIG. 6 is a flowchart illustrating a method of efficient RAID data regeneration using storage device management of ULBAs.

FIG. 6 illustrates a method of efficient RAID data regeneration using storage device management of ULBAs starting at block 600. ULBAs in a storage medium of a data storage device are detected in block 602. For example, ULBAs in the storage medium of data storage device 140 can be detected by a failing to read data at an LBA in response to a read issued from RAID controller 120, a self-test failure, a background media scan failure, or another failure. The detected ULBAs are logged into a ULBA table in block 604. Here, drive controller 142 can operate to write the detected ULBAs into ULBA table 144, including additional information related to the method of detection of the ULBAs, the physical block addresses associated with the ULBAs, and timestamps. The ULBA table is provided to a RAID controller in block 606. For example, data storage device 140 can provide ULBA table 144 to RAID controller 120, or can provide subsets of the ULBAs to the RAID controller. The RAID controller recovers the unrecoverable data from the ULBAs listed in the ULBA table in block 608. For example, RAID controller 120 can regenerate the data for a ULBA based upon the associated mirrored, striped, or parity data on data storage devices 150 and 160. The RAID controller writes back the recovered data to the LBA in block 610.

Upon receiving the write operation to the LBA, the data storage device removes the LBA information from the ULBA table in block 612. For example, drive controller 142 can remove the information associated with a write to an LBA from ULBA table 144. A failure rate for ULBAs is determined in block 614. For example, RAID controller 120 or data storage device 140 can determine the rate of ULBA failures. A decision is made as to whether or not the failure rate is greater than a failure threshold in decision block 616. If not, the "NO" branch of decision block 616 is taken, and the method returns to block 602 where new ULBAs in the storage medium are detected. If the failure rate is greater than the failure threshold, the "YES" branch of decision block 616 is taken, an indication is provided that the data storage device is in danger of failing in block 618, and the method returns to block 602 where new ULBAs in the storage medium are detected. In a particular embodiment, the RAID controller gives priority to recovering data for ULBAs in a particular data storage device based upon the current failure rate for that particular data storage device being greater than the failure rate for the other data storage devices in the RAID array.

Figure 7:
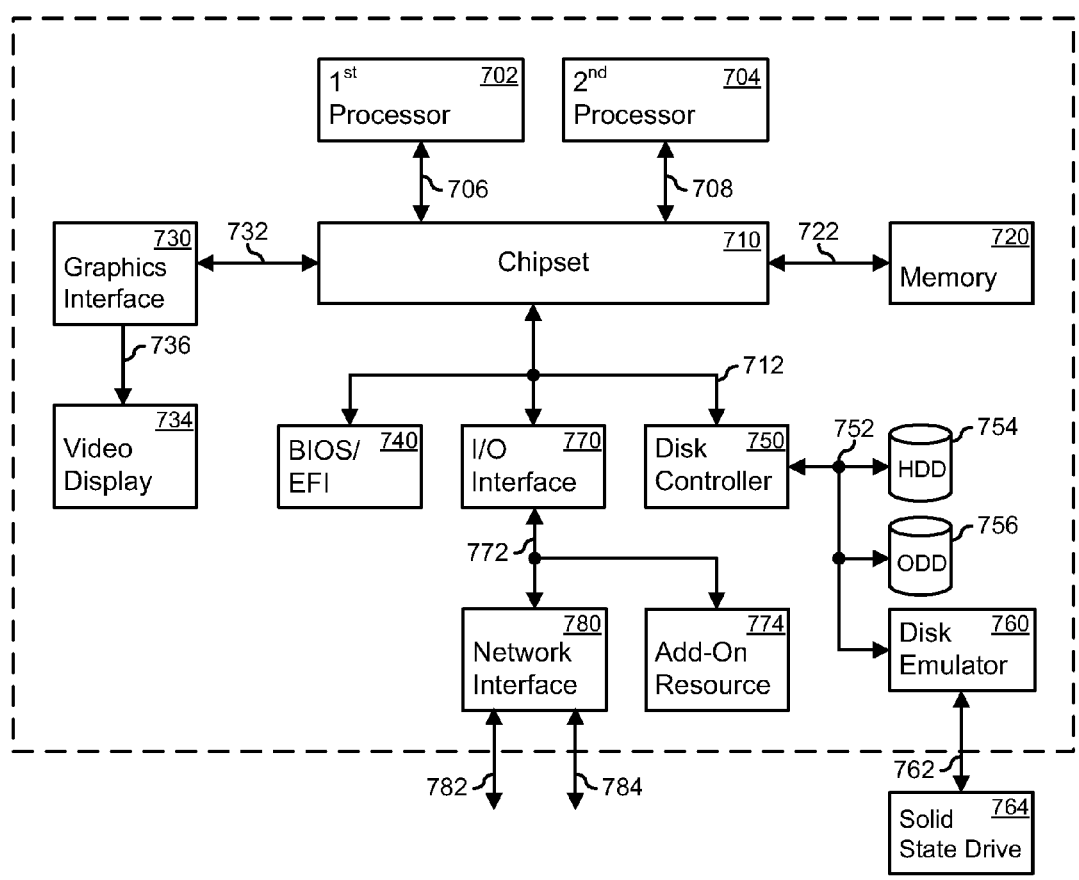
FIG. 7 is a block diagram illustrating a generalized information handling system according to an embodiment of the present disclosure.

FIG. 7 illustrates a generalized embodiment of information handling system 700. For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described above, and operates to perform one or more of the methods described above. Information handling system 700 includes a processors 702 and 704, a chipset 710, a memory 720, a graphics interface 730, include a basic input and output system/extensible firmware interface (BIOS/EFI) module 740, a disk controller 750, a disk emulator 760, an input/output (I/O) interface 770, and a network interface 780. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be coupled to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Redundant Array of Independent Drives (RAID) controller, comprising:
   a memory; and
   a processor operable to:
   request a subset of an unrecoverable logical block address (LBA) table from a data storage device coupled to the RAID controller, wherein the subset of the unrecoverable LBA table includes unrecoverable LBAs associated with a particular physical block address;
   determine, from the subset of the unrecoverable LBA table, a first LBA of the data storage device that includes first unrecoverable data;
   reconstruct the first unrecoverable data at a time when the RAID controller is idle;
   and issue a write of the reconstructed data to the first LBA;
   determine, from the subset of the unrecoverable LBA table, a second LBA of the data storage device that includes second unrecoverable data;
   determine that a number of LBAs that include unrecoverable data from the subset of the unrecoverable LBA table exceeds a first threshold failure rate based upon the determination that the second LBA includes second unrecoverable data; and
   indicate that the storage device is in danger of failing based upon the determination that the number of LBAs that include unrecoverable data exceeds the first threshold failure rate.

2. The RAID controller of claim 1, wherein the subset of the unrecoverable LBA table comprises information related to a failure to read data stored at the first LBA.

3. The RAID controller of claim 2, wherein the information includes a source of detecting the failure.

4. The RAID controller of claim 3, wherein the source of detecting the failure includes at least one of a RAID controller read error, a data storage device self test error, and a data storage device background media scan.

5. The RAID controller of claim 2, wherein the information includes a physical block of the data storage device associated with the first LBA.

6. The RAID controller of claim 2, wherein the information includes a timestamp for the failure.

7. The RAID controller of claim 1, wherein the processor is further operable to:
   determine, from the subset of the unrecoverable LBA table, a third LBA of the data storage device that includes third unrecoverable data;
   determine that a rate at which the data storage device detected the first unrecoverable data and the third recoverable data exceeds a second threshold failure rate; and
   indicate that the data storage device is in danger of failing based upon the determination that the rate at which the data storage device detected the first unrecoverable data and the third recoverable data exceeds the second threshold failure rate.

8. A host processing system, comprising:
   a processor;
   a Redundant Array of Independent Drives (RAID) controller; and
   a data storage device coupled to the RAID controller and operable to:
   detect first unrecoverable data at a first logical block address (LBA) of the data storage device;
   log the first LBA in an unrecoverable LBA table of the data storage device;
   detect second unrecoverable data at a second LBA of the data storage device;
   log the second LBA in an unrecoverable LBA table of the data storage device;
   provide a subset of the unrecoverable LBA table to the RAID controller; and
   in response to receiving a write to the first LBA, remove the first LBA from the unrecoverable LBA table;
   wherein the RAID controller is operable to:
   request the subset of the unrecoverable LBA table from the data storage device, wherein the subset of the unrecoverable LBA table includes unrecoverable LBAs associated with a particular physical block address;
   determine, from the subset of the unrecoverable LBA table, a third LBA of the data storage device that includes third unrecoverable data;
   reconstruct the third unrecoverable data at a time when the RAID controller is idle; and issue a write of the reconstructed data to the third LBA;
   determine, from the subset of the unrecoverable LBA table, a fourth LBA of the data storage device that includes fourth unrecoverable data;
   determine that a number of LBAs that include unrecoverable data from the subset of the unrecoverable LBA table exceeds a first threshold failure rate based upon the determination that the fourth LBA includes fourth unrecoverable data; and
   indicate that the storage device is in danger of failing based upon the determination that the number of LBAs that include unrecoverable data exceeds the first threshold failure rate.

9. The host processing system of claim 8, wherein the log of the LBA in the unrecoverable LBA table comprises information related to a failure to read data stored at the first LBA.

10. The host processing system of claim 9, wherein the information includes a source of detecting the failure.

11. The host processing system of claim 10, wherein the source of detecting the failure includes at least one of a RAID controller read error, a self test error, and a background media scan.

12. The host processing system of claim 9, wherein the information includes a physical block associated with the first LBA.

13. The host processing system of claim 9, wherein the information includes a timestamp for the failure.

14. The host processing system of claim 8, wherein the data storage device is further operable to:
   detect fifth unrecoverable data at a fifth LBA of the data storage device;
   log the fifth LBA in the unrecoverable LBA table of the data storage device;

determine that a rate at which the data storage device detected the first unrecoverable data and the fifth recoverable data exceeds a second threshold failure rate; and provide an indication to the RAID controller that the data storage device is in danger of failing based upon determining that the rate at which the data storage device detected the first unrecoverable data and the fifth recoverable data exceeds the second threshold failure rate.

15. The host processing system of claim 8, wherein: the data storage device is further operable to:

detect fifth unrecoverable data at a fifth LBA of the data storage device;

log the fifth LBA in the unrecoverable LBA table of the data storage device; and provide the unrecoverable LBA table to the RAID controller a second time; and the RAID controller is further operable to:

determine that a rate at which the data storage device detected the first unrecoverable data and the fifth recoverable data exceeds a threshold failure rate; and indicate that the data storage device is in danger of failing based upon determining that the rate at which the data storage device detected the first unrecoverable data and the fifth recoverable data exceeds the threshold failure rate.

16. A method comprising:

detecting, by a data storage device, first unrecoverable data at a first logical block address (LBA) of the data storage device;

logging the first LBA in an unrecoverable LBA table of the data storage device;

detecting second unrecoverable data at a second LBA of the data storage device;

logging the second LBA in the unrecoverable LBA table of the data storage device;

receiving, at a Redundant Array of Independent Drives (RAID) controller, a subset of the unrecoverable LBA table, wherein the subset of the unrecoverable LBA table includes unrecoverable LBAs associated with a particular source of failure;

determining, from the subset of the unrecoverable LBA table, a third LBA of the data storage device that includes third unrecoverable data;

reconstructing, at the RAID controller, the third unrecoverable data in response to receiving the subset of the unrecoverable LBA table, wherein the reconstructing is at a time when the RAID controller is idle;

issuing, by the RAID controller, a write of the reconstructed data to the third LBA; and in response to receiving a write to the third LBA, removing the third LBA from the unrecoverable LBA table;

determining, from the subset of the unrecoverable LBA table, a fourth LBA of the data storage device that includes fourth unrecoverable data;

determining that a number of LBAs that include unrecoverable data from the subset of the unrecoverable LBA table exceeds a first threshold failure rate based upon the determination that the fourth LBA includes fourth unrecoverable data; and indicating that the storage device is in danger of failing based upon the determination that the number of LBAs that include unrecoverable data exceeds the first threshold failure rate.

17. The method of claim 16, wherein the log of the first LBA in the unrecoverable LBA table comprises information related to a failure to read data stored at the first LBA.

18. The method of claim 17, wherein the information includes a source of detecting the failure, the source of detecting the failure including at least one of a RAID controller read error, a self test error, and a background media scan.

19. The method of claim 17, wherein the information includes at least one of a physical block associated with the first LBA, and a timestamp for the failure.

20. The method of claim 16, further comprising:

detecting fifth unrecoverable data at a fifth LBA of the data storage device;

logging the fifth LBA in the unrecoverable LBA table of the data storage device;

determining that a rate at which the data storage device detected the first unrecoverable data and the second fifth recoverable data exceeds a second threshold failure rate; and indicating that the data storage device is in danger of failing based upon determining that the rate at which the data storage device detected the first unrecoverable data and the second fifth recoverable data exceeds the second threshold failure rate.

* * * * *

UNITED STATES PATENT AND TRADEMARK OFFICE
CERTIFICATE OF CORRECTION

PATENT NO.       : 9,529,674 B2
APPLICATION NO.  : 13/920731
DATED            : December 27, 2016
INVENTOR(S)      : David M. Pereira and Chandrashekar Nelogal It is certified that error appears in the above-identified patent and that said Letters Patent is hereby corrected as shown below:

In the Claims

Column 12, Claim 20, Lines 38-44, change:
"determining that a rate at which the data storage device detected the first unrecoverable data and the second fifth recoverable data exceeds a second threshold failure rate; and
indicating that the data storage device is in danger of failing based upon determining that the rate at which the data storage device detected the first unrecoverable data and the second fifth recoverable data exceeds the second threshold failure rate."

To:
--determining that a rate at which the data storage device detected the first unrecoverable data and the fifth recoverable data exceeds a second threshold failure rate; and
indicating that the data storage device is in danger of failing based upon determining that the rate at which the data storage device detected the first unrecoverable data and the fifth recoverable data exceeds the second threshold failure rate.--

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*